United States Patent
Holroyd et al.

(10) Patent No.: US 11,968,087 B2
(45) Date of Patent: Apr. 23, 2024

(54) UNUSED DEVICE REPURPOSING SYSTEM

(71) Applicant: Lenovo (Singapore) Pte. Ltd., Singapore (SG)

(72) Inventors: William Holroyd, Holly Springs, NC (US); Girishpurushottam Holabasappa Hoogar, Apex, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 17/710,060

(22) Filed: Mar. 31, 2022

(65) Prior Publication Data
US 2023/0318918 A1   Oct. 5, 2023

(51) Int. Cl.
*H04L 41/0823* (2022.01)
*H04L 41/0816* (2022.01)
*H04L 67/1061* (2022.01)

(52) U.S. Cl.
CPC ...... *H04L 41/0823* (2013.01); *H04L 41/0816* (2013.01); *H04L 67/1061* (2013.01)

(58) Field of Classification Search
CPC ............. H04L 41/0823; H04L 41/0816; H04L 67/1061
See application file for complete search history.

(56) References Cited

U.S. PATENT DOCUMENTS

| | | | | |
|---|---|---|---|---|
| 6,968,323 B1 * | 11/2005 | Bansal | ............... | G06Q 30/0283 379/309 |
| 10,540,202 B1 * | 1/2020 | Smaldone | ............. | G06F 9/5027 |
| 11,201,835 B1 * | 12/2021 | Roberts | ................. | H04L 47/781 |
| 11,665,141 B1 * | 5/2023 | Ilcevic | ................ | H04L 63/0838 726/15 |
| 2013/0136101 A1 * | 5/2013 | Guo | ....................... | H04W 28/18 370/329 |
| 2014/0136295 A1 * | 5/2014 | Wasser | ................... | G06Q 10/04 705/7.38 |
| 2015/0317595 A1 * | 11/2015 | De | ......................... | G06F 9/4887 705/7.15 |
| 2016/0036924 A1 * | 2/2016 | Koppolu | ............. | H04L 67/1025 709/224 |

(Continued)

FOREIGN PATENT DOCUMENTS

| | | | | |
|---|---|---|---|---|
| CN | 110120888 A | * | 8/2019 | ......... H04L 41/0823 |
| WO | WO-2021013124 A1 | * | 1/2021 | ........... G06F 9/4881 |

*Primary Examiner* — Thu V Nguyen
*Assistant Examiner* — Angela M Widhalm De Rodriguez
(74) *Attorney, Agent, or Firm* — Ference & Associates LLC

(57) ABSTRACT

One embodiment provides a method, the method including: detecting, using a device repurposing system, at least one device, connected to a network comprising at least one other device, currently unused by a user; determining, using the device repurposing system, one or more attributes of the at least one device; identifying, using the device repurposing system and based upon the one or more attributes of the at least one device, at least one use for the at least one device within the network while the at least one device is unused, wherein the identifying is based upon requirements of the at least one use; and providing, using the device repurposing system, a recommendation to a user to employ the at least one device for the at least one use while the at least one device is unused by the user.

20 Claims, 3 Drawing Sheets

(56) References Cited

U.S. PATENT DOCUMENTS

| | | | |
|---|---|---|---|
| 2016/0156682 A1* | 6/2016 | Jeon | H04L 67/303 |
| | | | 709/204 |
| 2016/0301624 A1* | 10/2016 | Gonzalez | G06F 9/5083 |
| 2016/0323880 A1* | 11/2016 | Luo | H04L 41/0896 |
| 2018/0054472 A1* | 2/2018 | Greenspan | H04L 67/10 |
| 2021/0021542 A1* | 1/2021 | Nedeltchev | H04L 43/022 |
| 2021/0081355 A1* | 3/2021 | Bottger | G06F 16/113 |
| 2022/0164233 A1* | 5/2022 | Nagar | G06Q 10/06 |
| 2022/0261661 A1* | 8/2022 | Khaligh | G06Q 10/06314 |

* cited by examiner

UNUSED DEVICE REPURPOSING SYSTEM

BACKGROUND

Devices are used for many different purposes which means that a single user, household, corporation, and/or other entity generally have more than one device. Additionally, as devices become more advanced, users tend to upgrade devices to newer models with newer and more advanced features. However, users do not always give up or get rid of the old device. Additionally, there are frequently stretches of time that devices are not in use for one reason or another. For example, if the device is used a corporation, the corporation devices may not be used for stretches of time when workers are not at the corporation to access and use the device. As another example, for devices used at home, the devices may not be used for a stretch of time while the user is sleeping, at work, at school, and/or the like. Thus, at any given time, there may be multiple devices that are not actively being used within the household or other entity.

BRIEF SUMMARY

In summary, one aspect provides a method, the method including: detecting, using a device repurposing system, at least one device, connected to a network comprising at least one other device, currently unused by a user; determining, using the device repurposing system, one or more attributes of the at least one device; identifying, using the device repurposing system and based upon the one or more attributes of the at least one device, at least one use for the at least one device within the network while the at least one device is unused, wherein the identifying is based upon requirements of the at least one use; and providing, using the device repurposing system, a recommendation to a user to employ the at least one device for the at least one use while the at least one device is unused by the user.

Another aspect provides an information handling device, the information handling device including: a processor; a memory device that stores instructions that, when executed by the processor, causes the information handling device to: detect, using a device repurposing system, at least one device, connected to a network comprising at least one other device, currently unused by a user; determine, using the device repurposing system, one or more attributes of the at least one device; identify, using the device repurposing system and based upon the one or more attributes of the at least one device, at least one use for the at least one device within the network while the at least one device is unused, wherein the identifying is based upon requirements of the at least one use; and provide, using the device repurposing system, a recommendation to a user to employ the at least one device for the at least one use while the at least one device is unused by the user.

A further aspect provides a product, the product including: a computer-readable storage device that stores executable code that, when executed by a processor, causes the product to: detect, using a device repurposing system, at least one device, connected to a network comprising at least one other device, currently unused by a user; determine, using the device repurposing system, one or more attributes of the at least one device; identify, using the device repurposing system and based upon the one or more attributes of the at least one device, at least one use for the at least one device within the network while the at least one device is unused, wherein the identifying is based upon requirements of the at least one use; and provide, using the device repurposing system, a recommendation to a user to employ the at least one device for the at least one use while the at least one device is unused by the user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
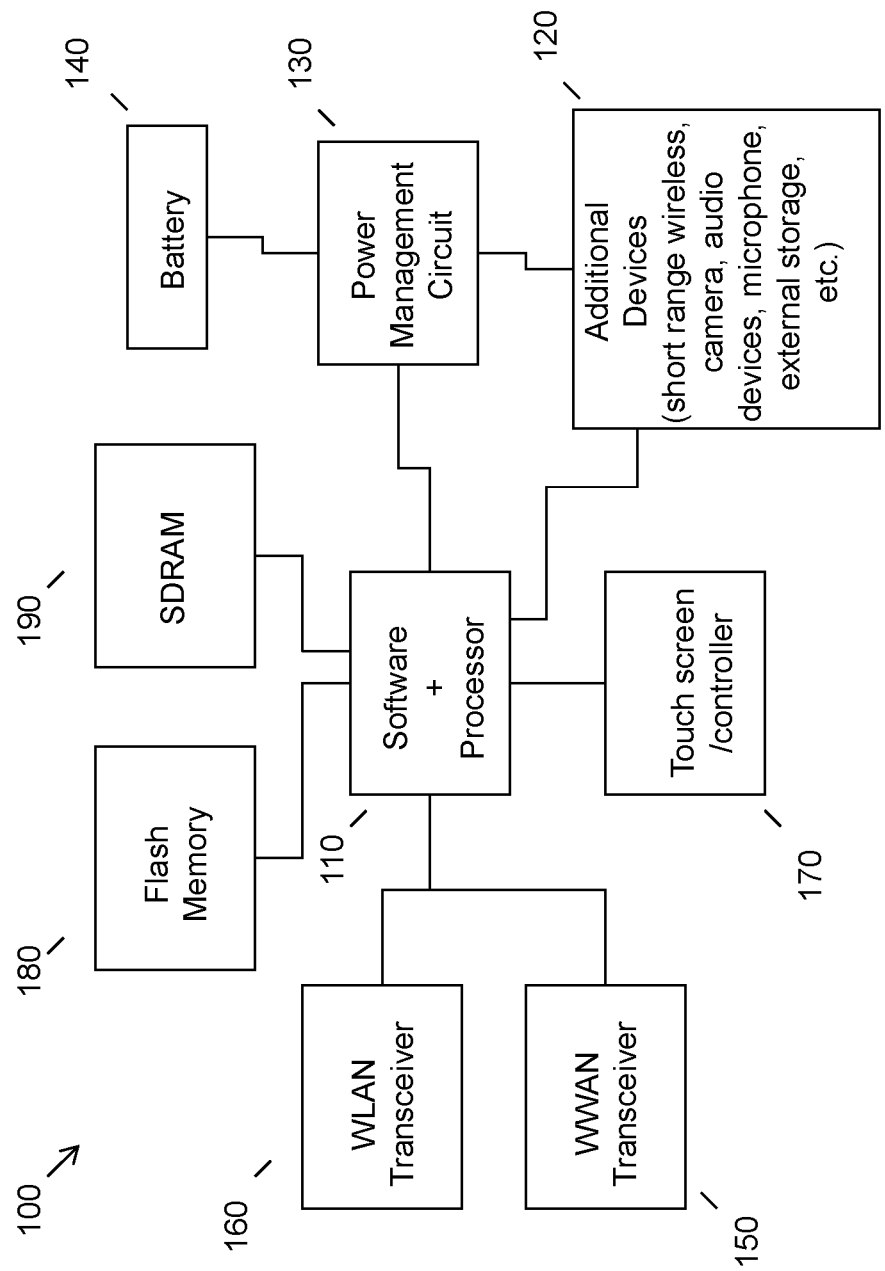
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Devices that are not being actively used, whether because a user is not within proximity to use the device, because the device is no longer the main device used by the user for some primary purpose, or for some other reason, represent resources that could be utilized for other uses or purposes while it is unused. However, users do not typically think about using unused devices for other purposes, for example, using the resources of the device to perform other tasks. Additionally, a user may not know that a device could be used for a different use or purpose. In other words, even if the user did want to use the device for a new purpose, the user would not know what purpose for which the device could be utilized.

Additionally, many devices are controlled by one entity but generally utilized by another user, for example, computing resources of a company that are the property of the company, but utilized by the workers or employees of the company. Accordingly, the employee would not be authorized to use the device for another purpose and the company would not want to utilize the device for a purpose that would prevent the employee from using the device for the primary purpose. Thus, the result is many unused or underutilized devices.

There are places that will take used devices and dispose of the device. There are also lists that explain how a user can dispose of an old device. However, devices, while no longer utilized, are not necessarily devices that cannot be used for any purpose any more. Additionally, users may not want to dispose of their old devices, making these lists useless to the user. Finally, some devices are not completely unused, but rather unused for stretches of time. Thus, these devices cannot be disposed of, but need to be kept. Additionally, while there are resource capacity resale markets, the device has to be enrolled in the market and the market is external to the user's network or system. In other words, the resource utilization of the device benefits some other user or entity and does not primarily benefit from the user.

Accordingly, the described system and method provides a technique for providing recommendations to users for repurposing unused devices for other uses based upon attributes of the unused devices and requirements of an identified possible use. The device repurposing system detects at least one device that is currently unused by a user. Unused may refer to a device that is not actively being used by a system. Therefore, an unused device could be device that is not used for a stretch of time (e.g., a half hour, eight hours, a few days, a couple of weeks, etc.) but is then used, a device that is minimally used (e.g., once every few weeks, once a month, once a year, etc.), and/or a device that is no longer used. The device may be connected to a network that includes at least one other device, for example, in an Internet of Things (IoT) environment, a home or corporate network, a cloud network, and/or the like.

The system may determine one or more attributes of the device, for example, processing resources and/or capabilities, memory resources and/or capabilities, applications or systems of the device, connected or accessible peripherals (e.g., printer, display, scanner, fax, external storage device, etc.), connected or accessible external applications (e.g., connected to a cloud device, connected to a data storage location and/or device, etc.), device type, and/or the like. Based upon the attributes, the system can identify one or more uses that for which the device could be used. The uses may be uses for the single device or may be uses that would utilize more than one unused device. The identified use(s) is based upon the requirements of the use in view of the attributes of the device. Based upon the identified use(s), the system can provide a recommendation to a user for using the device for the identified use(s). The recommendation may not only identify the use, but may also identify a plan for employing the device for the use(s) and any actions that need to be performed by the user in order to employ the device for the use(s).

Therefore, a system provides a technical improvement over traditional methods for utilizing devices. Rather than allowing devices that could be used for other purposes to remain unused or underutilized, the described system and method provides a technique to identify secondary or other uses for which the device could be used. Since the system identifies unused devices, which are either devices that are no longer used, rarely used, or that have stretches of time where they are not used, and the attributes of the devices, the system can identify how the device could be utilized, either alone or in combination with other devices, to perform one or more tasks that may be beneficial to the user. This is in contrast to conventional techniques which are unable to identify unused devices, determine a use for the unused device, and provide a recommendation to a user for utilizing the unused device. Thus, the described system and method provides a technique that can utilize unused or underutilized devices, thereby reducing device waste and providing benefits to the user or entity.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
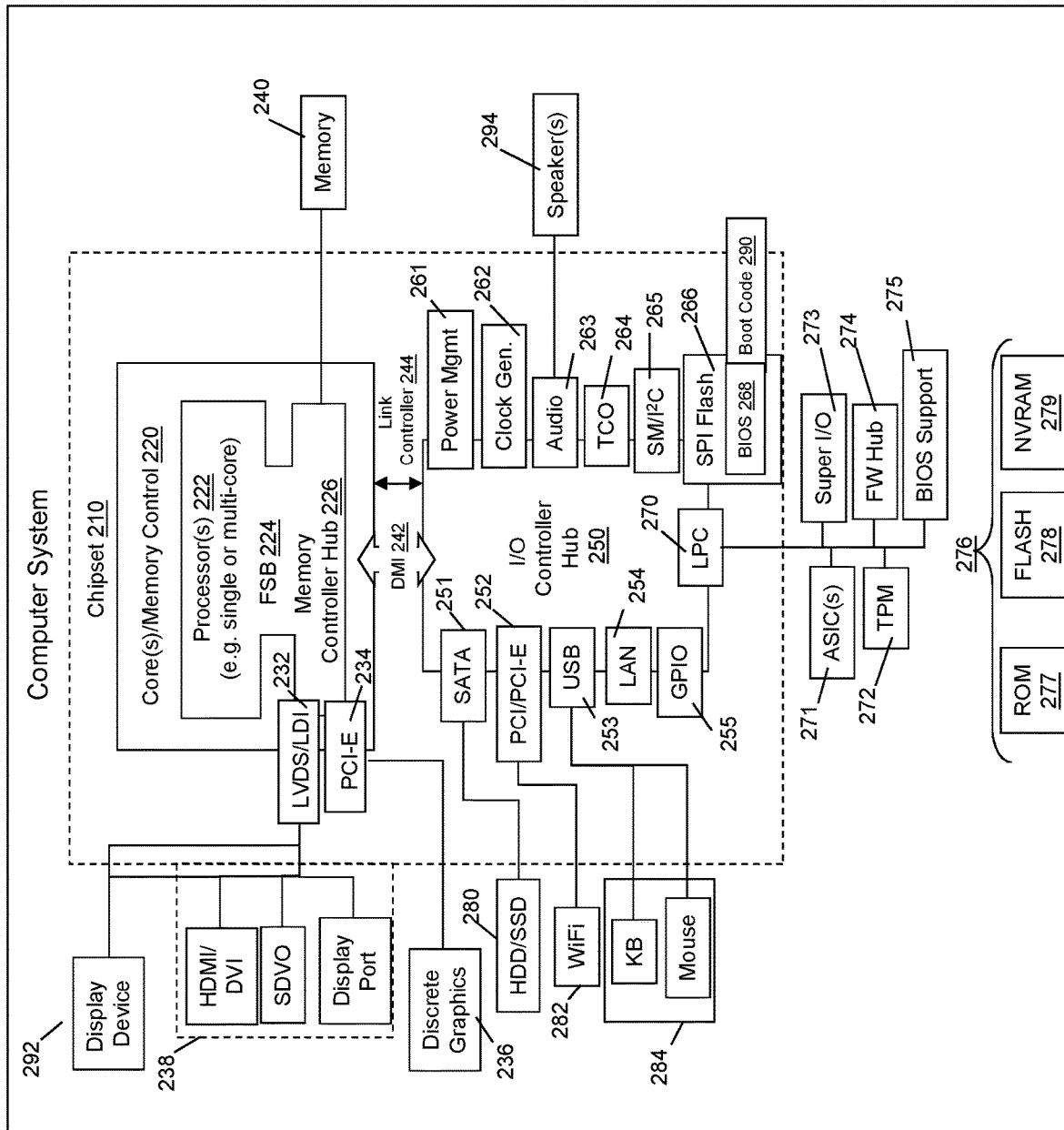
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems that identify uses for unused devices and employ unused devices for other uses. For example, the circuitry outlined in FIG. 1 may be implemented in a tablet or smart phone embodiment, whereas the circuitry outlined in FIG. 2 may be implemented in a personal computer embodiment.

Figure 3:
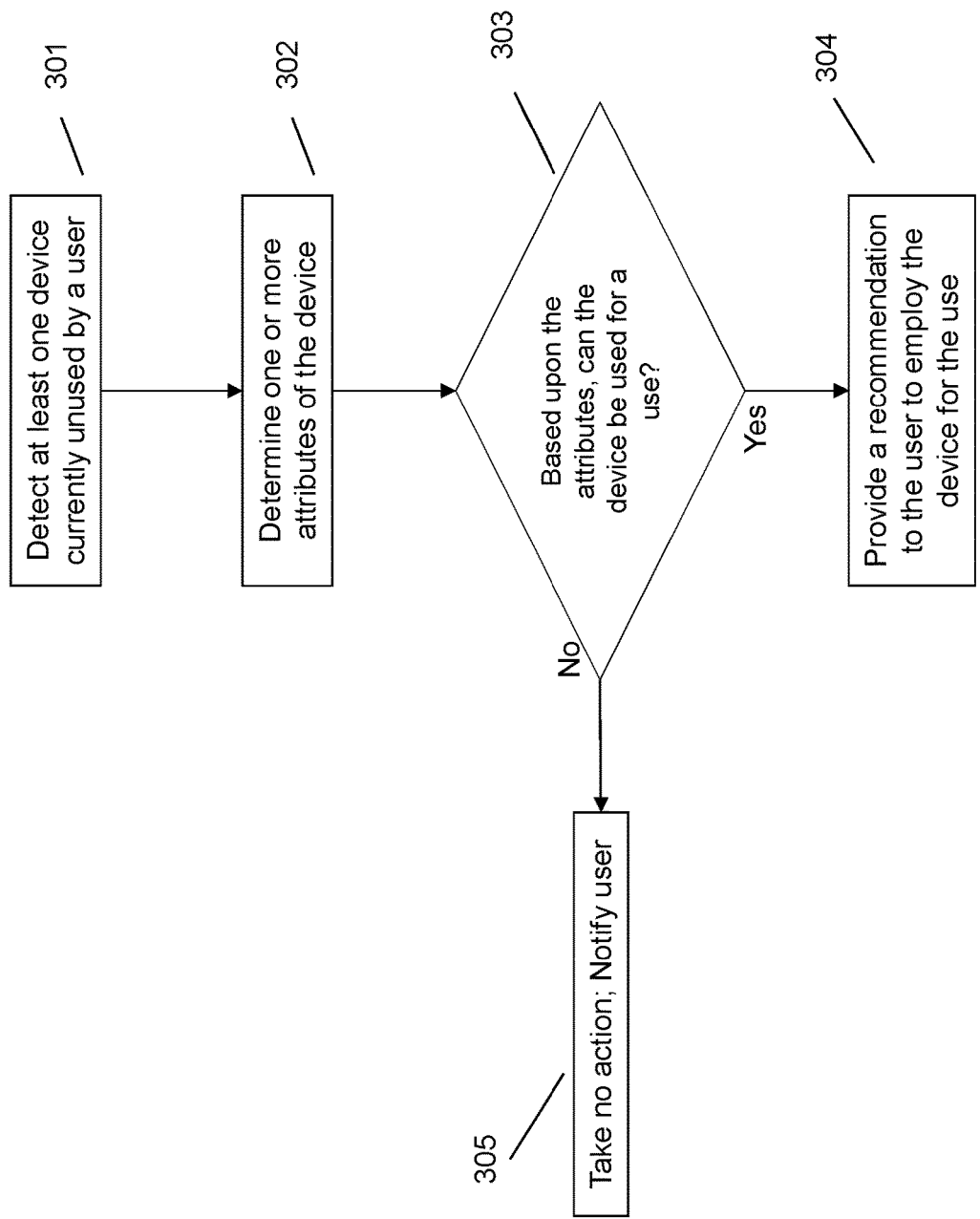
FIG. 3 illustrates an example method for providing recommendations to users for repurposing unused devices for other uses based upon attributes of the unused devices and requirements of an identified possible use.

FIG. 3 illustrates an example method for providing recommendations to users for repurposing unused devices for other uses based upon attributes of the unused devices and requirements of an identified possible use. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to identify uses for unused devices and employ unused devices for the identified uses. Additionally, the device repurposing system includes modules and features that are unique to the described system.

For ease of readability, the example of a user device within a household will be used herein. However, it should be understood that this is a non-limiting example, as many different use cases can utilize the described system and method, for example, corporations using corporate devices generally used by employees, entities using system devices that are generally used during working hours or hours the entity is open to the public, and/or the like.

At 301, the device repurposing system detects at least one device (e.g., smart phone, laptop, tablet, personal digital assistant, gaming device, personal computer, and/or any other device having processing capabilities) currently unused by a user. An unused device is a device that is not actively being used by the user or any other user. The unused device may be a device that has not been used by a user for a significant length of time (e.g., months, years, etc.). For example, when a user gets a new device, the user may keep the old device, but may no longer use the old device. The unused device may be one that gets minimal or infrequent use (e.g., once a week, once a month, once every couple of months, etc.). For example, a user may use a gaming device when certain visitors who visit once a year are in the residence.

The unused device may be a device that is frequently or commonly used, but that is unused for lengths of time (e.g., thirty minutes, a few hours, overnight, etc.). For example, a user may use a smart television while awake, but it remains unused while everyone in the household is asleep. As another example, corporate-owned employee devices may remain unused overnight. As another example, a user may use a stereo system for a few hours a day and it remains unused for the remaining hours. As a final, non-limiting example, a digital assistant device or system may be used multiple times a day, but remain unused for lengths of time between the used time. The amount of time a device needs to remain unused for the purposes of the device repurposing system can vary between possible uses of the unused device. In other words, some uses may need to have dedicated extended chunks of time, whereas other uses may be able to utilize a device that is only unused for five or ten minutes at a time.

The system may detect that a device is infrequently used, never used, and/or has some periods of time that it remains unused. The system may determine that a device is not actively used for a predetermined length of time (e.g., five minutes, a day, a week, etc.) and then may identify that device as an unused device. The predetermined length of time may be a default time value, a time value set by a user, and/or the like. Additionally, or alternatively, the predetermined length of time may be dependent on the possible use of the unused device. As previously mentioned, different use cases may need to use devices for a specific length of time. Thus, the device would need to remain unused for at least that specific length of time. Since some devices may be used some times, the system may detect that a device is unused at particular periods of time that appear to reoccur. For example, the system may detect that a device remains unused between the hours of midnight and 6:00 am. Thus, the system may detect that the device is unused by the user for a length of time occurring more than once during a period of time (e.g., during a day, during a week, during a month, etc.). Accordingly, the system can create a schedule of devices and times and days that the devices are unused.

The device is connected to a network that includes at least one other device. The other device may be other user devices, other unused devices, network devices, or the like. For example, the device may be connected to other devices within the household via a network (e.g., cloud network, remote network, local network, etc.), through one or more devices that are in communicative operation with each other (e.g., devices are connected to one or more digital assistants but are not directly connected to other devices connected to the digital assistants, etc.), and/or the like. In other words, either through the device itself or a device the device is connected to, the device is in communication with at least one other device. As an example, the devices may be connected to a router, central hub, cloud network device, and/or the like.

To detect that a device is unused the system may utilize one or more sensors or components (e.g., proximity sensors, image capture devices, microphones, speakers, input devices, output devices, heat detection sensors, biometric sensors, application usage sensors, gyroscopes, accelerometers, etc.), the device itself, other devices, network devices, and/or the like. The system may monitor the device for use. This monitoring may be performed by the device itself and then relayed to the system. The system may also directly monitor the device or request status updates regarding the use of the device periodically from the device. The device may use one or more sensors of the device, applications, system usage data, and/or the like, to determine if the device is actively being used. The system may also employ devices other than the device to determine if and when a device is unused, for example, image capture device, to detect a location of the device and whether a user is within proximity to the device and/or if the device is powered on.

The system may also utilize a network device (e.g., router, central hub, cloud device, etc.) to determine if a device is communicating to the network device, other devices in operative communication with the network device, and/or the like. Connection to the network can occur via a registration action made by a device owner (e.g., the owner connecting the device to a wireless network, IoT system, etc.), a discovery protocol which discovers devices in communication proximity to the network or network-connected device, and/or the like. If the device is no longer performing external communications, meaning it is not attempting to access an external communication network (e.g., cloud network, local network, remote network, data network, etc.), this may be indicative of the device being unused. Most devices that have processing capabilities and that are also able to communicate with other devices, for example, the devices within the device repurposing system, would have external communication capabilities, either via a wired or wireless communication connection. If the device is not using the external communication capabilities, it is likely the device is not being used. Thus, the lack of external communication is an indicator of unuse of a device.

Additionally, as devices connect to a network device, either directly or indirectly, the network device or device repurposing system can log the devices. When logging the devices, the system may log other information about the devices, for example, attributes of the device. The system may then create a catalog of devices and attributes associated with the devices. As devices communicate with the network device, the system can log the communications and use this to identify when a device is unused, for the lengths of time that the device is unused, if there is a pattern to the times of unuse, and/or other information related to the use of the device. This information identifies historical connection data for any devices that have been connected to the network or other devices within the system.

Using the cataloged information, the system can identify unused devices. The system may detect that a device is unused because it was once connected to the network and is no longer communicating with the network. In this case, the network may ping the device to identify if the device is still within network proximity. The system may also detect that a device is still connected to the network, but is no longer using the network for communications or external communications or has not used the network for communications or external communications for a predetermined length of time. The system may ping the device for system usage data, which would provide a direct indicator of device usage. Since some applications of a device may be background devices and may not need active user involvement, the system may filter the system usage data to filter out system activities that do not require active user involvement to assist in identifying an unused device or a time of unuse of a device.

In addition to detecting an unused device at 301, the system also detects one or more attributes about the device at 302. These attributes may be included in the catalog previously mentioned. Attributes may include device attributes, for example, device type (e.g., tablet, smart phone, smart watch, television, gaming system, laptop, personal computer, smart appliance, etc.), make and model of the device, device identifier, and/or the like. Attributes may include resource attributes about the device, for example, processing capabilities, memory resources, applications, peripherals connected to or accessible by the device, primary use of the device, and/or the like. Attributes may include user attributes, for example, primary user, stored user credentials, and/or the like. It should be understood that these are non-limiting examples of attributes as any attributes that would be helpful in identifying a device as unused, identifying a possible use for the device, and/or the like can be identified and stored, for example, security attributes, connection or communication attributes, and/or the like.

At 303, the device repurposing system may identify, based upon the one or more identified attributes and the unused device information (e.g., schedule of use, frequency of use, etc.), whether at least one use for the device can be identified. To determine if the device can be used for one or more uses, the system may identify possible uses for the device. Possible uses may include uses for the device by itself or may include uses that combine resources of multiple devices together. For example, if one unused device has processing resources that are needed for the use and another device has memory resources that are needed for the use, the system can identify that the device used together with another device to perform the use. In other words, the system can identify devices that can be used together in a connected and unified fabric or service.

The use may be a use identified by a user. For example, the user may want a particular purpose or use fulfilled and may indicate such to the system. The system can then use an algorithm to determine if any device and/or combination of unused devices could be used to fulfill the purpose. The system can also have some set default uses that are common among households, corporations, and/or entities. The system may also provide a list of uses to a user and the user could select one or more uses. Additionally, as new uses are identified, invented, or otherwise made known, the possible uses can be updated.

The system may learn possible uses based upon use data from the household, corporation, and/or entity. Uses may be learned based upon how the entity (e.g., household, corporation, etc.) utilizes devices for other things. For example, if an entity stores a lot of files, the system may determine that file storage may be a possible use. As another example, if an entity performs a lot of data processing, the system may determine that back-end data processing may be a use. As another example, if an entity performs cryptocurrency mining, the system may determine that algorithm processing may be a use. It should be understood that these are non-limiting examples of learning uses and possible uses, as the system can learn other uses based upon user/entity information and other possible uses are contemplated.

Uses may also be identified based upon the capabilities of unused devices. For example, if the system determines that the unused device(s) has large amounts of processing capabilities, the system may determine that the device or combination of unused devices may be good candidates for processing-intensive uses, for example, as a node of a shared database (e.g., blockchain, cryptocurrency, etc.), virus detection system, classification system, and/or the like. Similarly, as another example, if the system determines that the unused device(s) has large amounts of unused data storage capabilities, the system may determine that the device or combination of unused devices may be good candidates for data storage intensive uses, for example, a back-up data storage repository, a primary data storage repository, and/or the like.

Some example possible uses may include, but are not limited to, providing a home storage service that can offload files from other devices for remote access, algorithmic processing, serverless microservice capabilities with data resiliency, smart home/home automation server, photo classification, enhancement, and categorization process, machine-learning model classification tasks, blockchain and/or cryptocurrency node, running other systems like data backup, ensuring parity mechanisms between devices, security system, replacing other devices having worse capabilities, backing up systems having stretched capabilities, and/or the like. These are merely example uses and are not intended to limit the scope of this disclosure to only these uses.

To determine if an unused device may be useful for a use, the system may identify requirements of the use and then identify if the unused device can meet any of those requirements. The requirements may include resource requirements (e.g., processing resources, memory resources, computational capacity, etc.), component requirements (e.g., peripheral use, communication connections, etc.), schedule or time requirements (e.g., amount of time the device needs to be unused for a period of time, frequency of use of the unused device for the use, etc.), and/or the like. Since devices may be used in combination with other devices, the unused device does not have to meet all of the requirements of the use. Rather, the system can determine if one or more devices can be used to fulfill a use and, if one or more devices or combination of devices, can be utilized, the system can optimize the use of each device either for the single use or for multiple uses.

Thus, the system can identify multiple uses for a single device. In the case that there are multiple uses, the system can identify if the multiple uses can be performed in conjunction with each other or are exclusive of each other. For example, multiple uses may require the same processing resources and can, therefore, not be performed at the same time using the same device. As a contrary example, one use may require processing resources and another use may require data storage resources, thus allowing the same device to be used for both uses. In the case that the device can be used for multiple uses, but cannot perform all uses at the same time, the system may prioritize uses, determine if other devices can perform a similar function, and/or the like. For example, assuming conflicting uses require computational capacity and data storage resources, if one device can be used for computational capacity and for data storage resources and another device could be used only for data storage resources, the system may utilize the first device for the computational capacity because the second device could be used for the data storage resources.

If no use can be identified for an unused device at 303, the system may take no action with respect to the unused device at 305. The system may also notify a user that the device cannot be used for a use at 305. In the event that the system determines the device is too obsolete or that the system is otherwise unable to use the unused device and the device is a device that is not actively used, the system may provide a recommendation of how to dispose of the device, for example, donation, trade-in, electronic recycling, and/or the like.

On the other hand, if a use for an unused device can be identified at 303, the device repurposing system may provide a recommendation to a user to employ the unused device for the identified use while or when the device is unused by the user at 304. In the case that an unused device is no longer actively used, used infrequently, does not have a display device, or some other reason that would make it unlikely a user would see a recommendation, the system may provide the recommendation on a second device, for example, a device commonly or frequently used by a user, a device previously identified by the user, and/or the like. The user may also choose to have such recommendations displayed on a particular device or display regardless of a frequency of use of the unused device.

When providing a recommendation, the system can provide an indication of the at least one use to a user. In other words, the system identifies what use, or uses, the unused device may be used for. The recommendation may also identify an execution plan for the use. The execution plan may identify the resources of the unused device that will be used, how frequently the unused device will be used, the schedule of when the unused device will be used, whether other devices will be used in combination with the device, and/or the like. The execution plan may also identify if the unused device could be abruptly removed from the use if wanted or needed. The recommendation may also include an action plan of instructions that identify actions that need to be performed by the user to implement the plan. For example, the system could identify that a device needs to be plugged in, connected to a particular network or other device, put into a specific mode, connected to a particular peripheral, change security settings or other security actions for devices identified as vulnerable, and/or the like. In the case that multiple uses are identified, the system may provide an execution plan and action plan for each use, may allow a user to select one or more uses of the multiple uses, identify how the device will be used for the multiple uses, and/or the like.

In response to the recommendation, the user may identify that the device can be and should be used for one or more of the recommended uses. Thus, the system may employ the device for the one or more uses while the device is in an unused state. As previously stated, whether a device is considered unused may be dependent on the use. For example, if the use needs the device for at least fifteen minutes at a time, a device being unused for five minutes will not trigger the device to be considered unused. On the other hand, for example, if the use can use a device for seconds at a time, a device unused for very short periods of time will trigger the device to be considered unused. If the system has detected that a device is unused for particular periods of time that reoccur, the system may schedule the device for use during the reoccurring length of time. For example, if the device is always unused at night, the system may schedule the device for the identified and selected use at night.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
    detecting, using a device repurposing system, at least one device, connected to a network comprising at least one other device, is currently unused by a user, wherein the detecting comprises determining the at least one device is not actively used by the user for a predetermined length of time;
    determining, using the device repurposing system, one or more attributes of the at least one device;
    identifying, using the device repurposing system and based upon the one or more attributes of the at least one device and responsive to detecting the at least one device as being currently unused by the user, at least one use for the at least one device within the network while the at least one device is unused, wherein whether the at least one device is identified as unused is based upon the at least one use and a use time length requirement of the at least one use, wherein the use time length requirement varies between possible uses of the at least one unused device, wherein the identifying is based upon determining one or more attributes of the at least one device meet identified requirements of the at least one use, wherein the at least one use comprises a task to be performed by the at least one device in conjunction with at least another device as a unified service and that utilizes a resource of the at least one device and the at least another device; and providing, using the device repurposing system and responsive to determining the at least one device meets the identified requirements, a recommendation to the user to employ the at least one device for the at least one use while the at least one device is unused by the user.

2. The method of claim 1, comprising employing, responsive to receiving user input to employ the at least one device for the at least one use, the at least one device for the at least one use while the at least one device is unused by the user.

3. The method of claim 2, wherein the detecting comprises detecting the at least one device is unused by the user for a length of time occurring more than once during a period of time and wherein the employing comprises scheduling the at least one device for the at least one use during the reoccurring length of time.

4. The method of claim 1, wherein the detecting comprises detecting the at least one device is unused for the predetermined length of time.

5. The method of claim 1, wherein the identifying comprises identifying resources of the at least one device.

6. The method of claim 1, wherein the providing a recommendation comprises providing an indication of the at least one use for the at least one device, providing a plan for employing the at least one device for the at least one use, and providing instructions identifying actions to be performed by the user to implement the plan.

7. The method of claim 1, wherein the at least one use comprises a data storage repository and wherein the providing a recommendation comprises identifying a plurality of unused devices comprising the at least one device to be used together as the data storage repository.

8. The method of claim 1, wherein the detecting comprises identifying, using historical connection data, devices connected to a network device that have not utilized the network device for external communications for the predetermined length of time.

9. The method of claim 1, wherein the at least one use comprises a node of a shared database.

10. The method of claim 1, wherein the identifying at least one use comprises identifying a plurality of uses and wherein the providing a recommendation comprises identifying a plan for utilizing the at least one device for the plurality of uses.

11. An information handling device, the information handling device comprising:
a processor;
a memory device that stores instructions that, when executed by the processor, causes the information handling device to:
detect, using a device repurposing system, at least one device, connected to a network comprising at least one other device, is currently unused by a user, wherein the detecting comprises determining the at least one device is not actively used by the user for a predetermined length of time;
determine, using the device repurposing system, one or more attributes of the at least one device;
identify, using the device repurposing system and based upon the one or more attributes of the at least one device and responsive to detecting the at least one device as being currently unused by the user, at least one use for the at least one device within the network while the at least one device is unused, wherein whether the at least one device is identified as unused is based upon the at least one use and a use time length requirement of the at least one use, wherein the use time length requirement varies between possible uses of the at least one unused device, wherein the identifying is based upon determining one or more attributes of the at least one device meet identified requirements of the at least one use, wherein the at least one use comprises a task to be performed by the at least one device in conjunction with at least another device as a unified service and that utilizes a resource of the at least one device and the at least another device; and provide, using the device repurposing system and responsive to determining the at least one device meets the identified requirements, a recommendation to the user to employ the at least one device for the at least one use while the at least one device is unused by the user.

12. The information handling device of claim 11, comprising employing, responsive to receiving user input to employ the at least one device for the at least one use, the at least one device for the at least one use while the at least one device is unused by the user.

13. The information handling device of claim 12, wherein the detecting comprises detecting the at least one device is unused by the user for a length of time occurring more than once during a period of time and wherein the employing comprises scheduling the at least one device for the at least one use during the reoccurring length of time.

14. The information handling device of claim 11, wherein the detecting comprises detecting the at least one device is unused for the predetermined length of time.

15. The information handling device of claim 11, wherein the identifying comprises identifying resources of the at least one device.

16. The information handling device of claim 11, wherein the providing a recommendation comprises providing an indication of the at least one use for the at least one device, providing a plan for employing the at least one device for the at least one use, and providing instructions identifying actions to be performed by the user to implement the plan.

17. The information handling device of claim 11, wherein the at least one use comprises a data storage repository and wherein the providing a recommendation comprises identifying a plurality of unused devices comprising the at least one device to be used together as the data storage repository.

18. The information handling device of claim 11, wherein the detecting comprises identifying, using historical connection data, devices connected to a network device that have not utilized the network device for external communications for the predetermined length of time.

19. The information handling device of claim 11, wherein the at least one use comprises a node of a shared database.

20. A product, the product comprising:
a computer-readable storage device that stores executable code that, when executed by a processor, causes the product to:
detect, using a device repurposing system, at least one device, connected to a network comprising at least one other device, is currently unused by a user, wherein the detecting comprises determining the at least one device is not actively used by the user for a predetermined length of time;
determine, using the device repurposing system, one or more attributes of the at least one device;

identify, using the device repurposing system and based upon the one or more attributes of the at least one device and responsive to detecting the at least one device as being currently unused by the user, at least one use for the at least one device within the network while the at least one device is unused, wherein whether the at least one device is identified as unused is based upon the at least one use and a use time length requirement of the at least one use, wherein the use time length requirement varies between possible uses of the at least one unused device, wherein the identifying is based upon determining one or more attributes of the at least one device meet identified requirements of the at least one use, wherein the at least one use comprises a task to be performed by the at least one device in conjunction with at least another device as a unified service and that utilizes a resource of the at least one device and the at least another device; and provide, using the device repurposing system and responsive to determining the at least one device meets the identified requirements, a recommendation to the user to employ the at least one device for the at least one use while the at least one device is unused by the user.

\* \* \* \* \*